United States Patent
Bae et al.

(10) Patent No.: US 11,479,292 B2
(45) Date of Patent: Oct. 25, 2022

(54) TORQUE COMPENSATING APPARATUS AND METHOD FOR MOTOR DRIVEN POWER STEERING SYSTEM

(71) Applicant: Hyundai Mobis Co., Ltd., Seoul (KR)

(72) Inventors: Sang Hong Bae, Yongin-si (KR);
Kyoung Soo Lim, Yongin-si (KR);
Lyoung Tae Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 969 days.

(21) Appl. No.: 16/229,762

(22) Filed: Dec. 21, 2018

(65) Prior Publication Data

US 2019/0193778 A1 Jun. 27, 2019

(30) Foreign Application Priority Data

Dec. 22, 2017 (KR) ........................ 10-2017-0178877

(51) Int. Cl.
*B62D 5/04* (2006.01)
*B62D 15/02* (2006.01)

(52) U.S. Cl.
CPC ......... *B62D 5/0466* (2013.01); *B62D 5/0463* (2013.01); *B62D 5/0472* (2013.01); *B62D 15/021* (2013.01)

(58) Field of Classification Search
CPC .. B62D 5/0463; B62D 5/0466; B62D 5/0472; B62D 6/00; B62D 15/021; B60W 2510/202; B60W 2510/205; B60W 2520/10; B60W 2520/28
See application file for complete search history.

(56) References Cited

U.S. PATENT DOCUMENTS

| 4,574,903 | A | * | 3/1986 | Hashimoto | ............ | B62D 6/007 |
| | | | | | | 180/446 |
| 4,607,717 | A | * | 8/1986 | Nakayama | ............... | B62D 5/06 |
| | | | | | | 180/421 |
| 4,664,211 | A | * | 5/1987 | Oshita | ................. | B62D 5/0466 |
| | | | | | | 180/446 |

(Continued)

FOREIGN PATENT DOCUMENTS

| CN | 102019957 | 4/2011 |
| DE | 10-2012-107597 | 2/2014 |

(Continued)

OTHER PUBLICATIONS

Office Action dated Dec. 31, 2020 for Chinese Patent Application No. 201811555245.5.

*Primary Examiner* — Minnah L Seoh
*Assistant Examiner* — Maurice L Williams
(74) *Attorney, Agent, or Firm* — H.C. Park & Associates, PLC

(57) ABSTRACT

A torque compensation apparatus for a Motor Driven Power Steering ("MDPS") system including: a column torque sensor configured to detect column torque applied to a steering shaft; a steering angle sensor configured to detect a steering angle of a steering wheel; and a controller configured to calculate a compensation ratio by sudden steering, based at least one of the column torque detected by the column torque sensor and a steering angular velocity calculated from the steering angle detected by the steering angle sensor. The basic assist torque outputted from the MDPS system is then compensated for according to the compensation ratio.

8 Claims, 3 Drawing Sheets

(56) References Cited

U.S. PATENT DOCUMENTS

| | | | | |
|---|---|---|---|---|
| 4,753,308 A * | 6/1988 | Noto | ............... | B62D 5/0463 180/446 |
| 4,753,309 A * | 6/1988 | Marumoto | ............ | B62D 5/0463 180/446 |
| 4,800,975 A * | 1/1989 | Oshita | ............... | B62D 5/0463 180/446 |
| 4,842,088 A * | 6/1989 | Oshita | ............... | B62D 5/0466 180/446 |
| 4,875,540 A * | 10/1989 | Oshita | ............... | B62D 5/0466 180/446 |
| 4,972,320 A * | 11/1990 | Sugiura | ............ | B62D 5/049 701/43 |
| 4,992,944 A * | 2/1991 | Noto | ............... | B62D 5/0463 701/41 |
| 5,253,725 A * | 10/1993 | Nishimoto | ........ | B62D 5/0466 180/446 |
| 5,448,482 A * | 9/1995 | Yamamoto | ......... | B62D 5/0466 180/446 |
| 5,729,107 A * | 3/1998 | Shimizu | ............ | B62D 5/0466 180/412 |
| 5,752,209 A * | 5/1998 | Nishimoto | ........ | B62D 5/0463 180/446 |
| 5,878,360 A * | 3/1999 | Nishino | ............ | B62D 5/0466 701/41 |
| 6,015,023 A * | 1/2000 | Mukai | ............... | B62D 5/0463 180/446 |
| 6,102,151 A * | 8/2000 | Shimizu | ............ | B62D 5/0466 180/443 |
| 6,134,490 A * | 10/2000 | Ito | ............... | B62D 5/0463 180/443 |
| 6,148,948 A * | 11/2000 | Shimizu | ............ | B62D 5/0463 180/446 |
| 6,148,949 A * | 11/2000 | Kobayashi | ........ | B62D 5/0463 180/404 |
| 6,681,884 B2 * | 1/2004 | Shimizu | ............ | B62D 5/065 180/422 |
| 6,838,846 B2 * | 1/2005 | Matsuoka | ......... | B62D 5/0466 180/443 |
| 6,843,342 B2 * | 1/2005 | Shimizu | ............ | B62D 5/065 180/422 |
| 6,854,560 B2 * | 2/2005 | Nishiyama | ........ | B62D 5/0463 180/446 |
| 6,968,920 B2 * | 11/2005 | Barton | ............ | B60T 8/1764 180/443 |
| 7,676,309 B2 * | 3/2010 | Tamaki | ............ | B62D 6/008 701/41 |
| 7,694,777 B2 * | 4/2010 | Yamashita | ........ | B62D 5/0463 180/443 |
| 7,725,227 B2 * | 5/2010 | Pattok | ............ | B62D 5/0472 701/41 |
| 8,005,594 B2 * | 8/2011 | Kobayashi | ........ | B62D 5/0466 701/42 |
| 8,022,651 B2 * | 9/2011 | Kifuku | ............ | B62D 5/0487 318/434 |
| 8,473,158 B2 * | 6/2013 | Naik | ............... | B62D 5/0463 701/41 |
| 8,494,715 B2 * | 7/2013 | Kariatsumari | ... | B62D 5/0472 701/41 |
| 9,452,778 B2 | 9/2016 | Heilig | | |
| 9,481,392 B2 * | 11/2016 | Gotou | ............ | B62D 5/0466 |
| 9,505,428 B2 * | 11/2016 | Chai | ............... | B62D 5/0463 |
| 9,688,307 B2 * | 6/2017 | Kataoka | ............ | B62D 5/0466 |
| 9,919,734 B2 * | 3/2018 | Kitazume | ......... | B62D 5/0481 |
| 10,065,674 B2 * | 9/2018 | Maeda | ............ | B62D 5/0481 |
| 2009/0266641 A1 | 10/2009 | Ehara et al. | | |
| 2013/0060427 A1 * | 3/2013 | Kataoka | ............ | B62D 5/0466 701/42 |
| 2015/0191200 A1 * | 7/2015 | Tsubaki | ............ | B62D 6/002 701/42 |

FOREIGN PATENT DOCUMENTS

| | | |
|---|---|---|
| JP | 10-203383 | 8/1998 |
| KR | 10-2003-0033845 | 5/2003 |
| KR | 10-0746696 | 8/2007 |
| KR | 10-2013-0066835 | 6/2013 |
| KR | 10-2015-0136885 | 12/2015 |

* cited by examiner

TORQUE COMPENSATING APPARATUS AND METHOD FOR MOTOR DRIVEN POWER STEERING SYSTEM

CROSS-REFERENCES TO RELATED APPLICATIONS

This application claims priority from and the benefit of Korean Patent Application No. 10-2017-0178877, filed on Dec. 22, 2017, which is hereby incorporated by reference for all purposes as if set forth herein.

BACKGROUND

Field

Exemplary embodiments relate to a torque compensation apparatus and method for a Motor Driven Power Steering ("MDPS") system, and more particularly, to a torque compensation apparatus and method for an MDPS system, which can compensate for assist torque of the MDPS system during sudden steering.

Discussion of the Background

The MDPS system refers to a system that enables a driver to easily perform a steering operation by providing a part of steering torque which the driver needs to apply to a steering wheel when steering a vehicle, using an assist power source.

The MDPS system determines driving conditions of the vehicle through a column torque sensor to measure a driver's column torque inputted to the steering wheel, a steering angle sensor to measure a steering angle or steering angular velocity of the steering wheel, and a vehicle velocity sensor to measure a vehicle velocity, and provides assist torque through an electric motor based on a column torque applied to a steering shaft when the driver operates the steering wheel.

Unlike the existing hydraulic steering system, the MDPS system generates torque through current control on the motor by a control unit such as an ECU (Electronic Control Unit), and thus includes various control logics for controlling the motor. Such control logics may include a logic for implementing a steering feel desired by a driver, a logic aiming to improve the stability of a vehicle, and a logic for improving system stability, and outputs of the respective logics are decided according to preset tuning parameter values.

The MDPS motor has output torque which decreases according to the increase of an operating speed, and assist torque outputted from the MDPS system relies on the tuning parameters of the respective logics. Therefore, when the tuning parameters of the respective logic circuits are improperly tuned, a driver may have a heavy steering feel during sudden steering. Furthermore, since a damping logic and returning logic, which are included in the MDPS system so as to perform damping and returning functions, strengthen self-alignment torque of the vehicle, the response to sudden steering may be degraded.

The related art of the present invention is disclosed in Korean Patent Publication No. 2013-0066835 published on Jun. 21, 2013.

The above information disclosed in this Background section is only for enhancement of understanding of the background of the invention and, therefore, it may contain information that does not constitute prior art.

SUMMARY

Exemplary embodiments of the present invention are directed to a torque compensation apparatus and method for an MDPS system, which can secure the degree of freedom in tuning, and solve a problem that a driver has a heavy steering feel during sudden steering which occurs when outputs of logics included in the conventional MDPS system rely on tuning parameters.

In one embodiment, a torque compensation apparatus for an MDPS system may include: a column torque sensor configured to detect a column torque applied to a steering shaft; a steering angle sensor configured to detect a steering angle of a steering wheel; and a controller configured to calculate a compensation ratio by sudden steering, based on one or more of the column torque detected by the column torque sensor and a steering angular velocity calculated from the steering angle detected by the steering angle sensor, and compensate for basic assist torque outputted from the MDPS system according to the compensation ratio.

The torque compensation apparatus may further include a vehicle velocity sensor configured to detect a vehicle velocity, wherein the controller calculates the compensation ratio by further considering the vehicle velocity detected by the vehicle velocity sensor.

The controller may calculate the compensation ratio, based on a column torque compensation gain which is calculated as a larger value as the column torque increases in a preset torque compensation section, a steering angular velocity compensation gain which is calculated as a larger value as the steering angular velocity increases in a preset angular velocity compensation section, and a vehicle velocity compensation gain which is calculated as a larger value as the vehicle velocity increases in a preset vehicle velocity compensation section.

When the compensation ratio has a value between 0 and 1, the controller may compensate for the basic assist torque by adding sudden steering compensation torque to the basic assist torque, the sudden steering compensation torque being calculated as the product of the basic assist torque and the compensation ratio.

The controller may not compensate for the basic assist torque when the compensation ratio has a value of 0, but compensate for the basic assist torque using preset maximum assist torque when the compensation ratio has a value of 1.

In another embodiment, a torque compensation method for an MDPS system may include: determining, by a controller, whether a steering state of a vehicle is a sudden steering state, based on one or more of a column torque and a steering angular velocity; calculating, by the controller, a compensation ratio by sudden steering based on one or more of the column torque and the steering angular velocity, when the steering state of the vehicle is a sudden steering state; and differently compensating for, by the controller, basic assist torque outputted from the MDPS system according to the compensation ratio.

In the calculating of the compensation ratio, the controller may calculate the compensation ratio by further considering a vehicle velocity.

In the calculating of the compensation ratio, the controller may calculate the compensation ratio, based on a column torque compensation gain which is calculated as a larger value as the column torque increases in a preset torque compensation section, a steering angular velocity compensation gain which is calculated as a larger value as the steering angular velocity increases in a preset angular velocity compensation section, and a vehicle velocity compensation gain which is calculated as a larger value as the vehicle velocity increases in a preset vehicle velocity compensation section.

In the compensating for the basic assist torque, when the compensation ratio has a value between 0 and 1, the controller may compensate for the basic assist torque by adding sudden steering compensation torque to the basic assist torque, the sudden steering compensation torque being calculated as the product of the basic assist torque and the compensation ratio.

In the compensating for the basic assist torque, when the compensation ratio has a value of 1, the controller may compensate for the basic assist torque using preset maximum assist torque.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
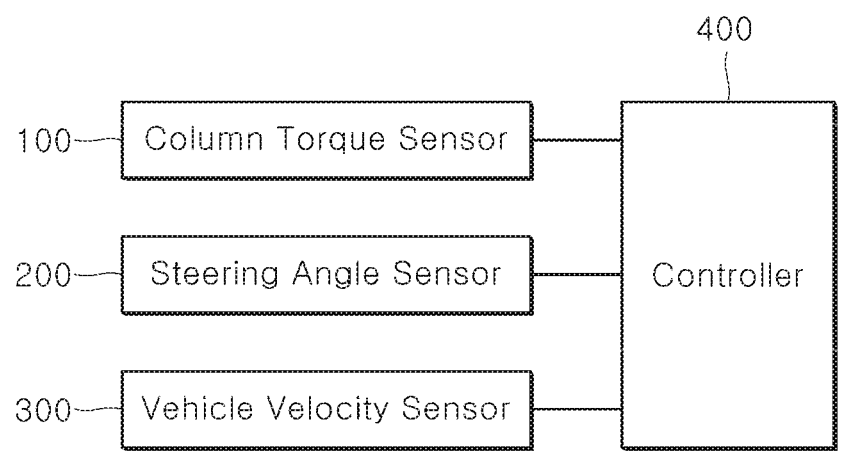
FIG. 1 is a block diagram illustrating a torque compensation apparatus for an MDPS system in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
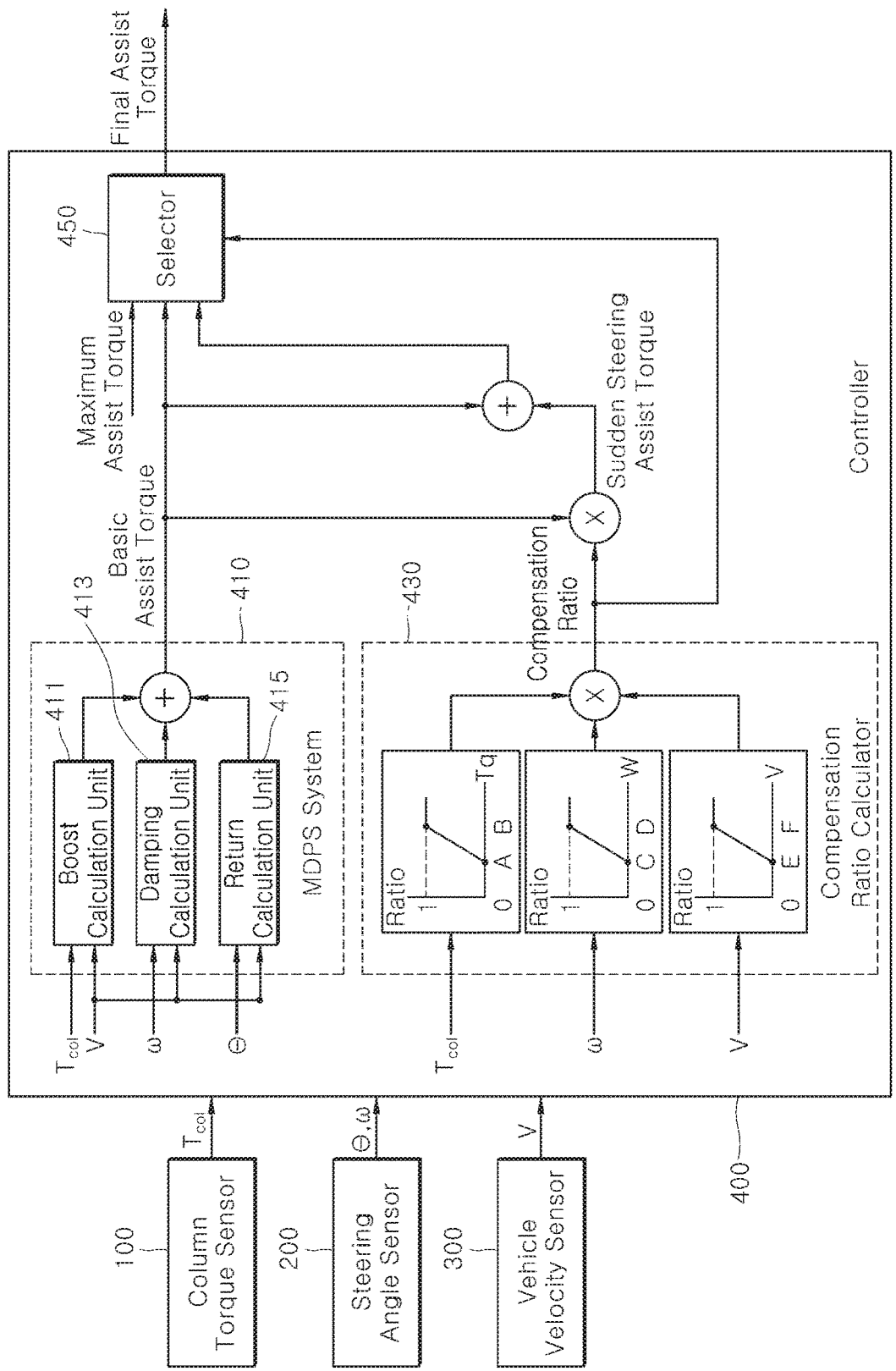
FIG. 2 illustrates an operation of the torque compensation apparatus for an MDPS system in accordance with the embodiment of the present invention.

FIG. 1 is a block diagram illustrating a torque compensation apparatus for an MDPS system in accordance with an embodiment of the present invention, and FIG. 2 illustrates an operation of the torque compensation apparatus for an MDPS system in accordance with the embodiment of the present invention.

Referring to FIG. 1, the torque compensation apparatus for an MDPS system in accordance with the embodiment of the present invention may include a column torque sensor 100, a steering angle sensor 200, a vehicle velocity sensor 300 and a controller 400.

The column torque sensor 100 may detect a column torque Tcol applied to a steering shaft when a driver operates a steering wheel, and output the detected column torque Tcol to the controller 400. The detected column torque Tcol may be used when the controller 400 calculates basic assist torque and a compensation ratio depending on sudden steering as described later.

The steering angle sensor 200 may detect a steering angle θ of the steering wheel, and transfer the detected steering angle θ to the controller 400. The steering angle sensor 200 may include an optical sensor to detect a steering angular velocity ω. Also, the steering angle sensor 200 may measure the steering angle θ and differentiate the measured steering angle with respect to time, in order to detect the steering angular velocity ω. In another embodiment, the controller 400 may receive the steering angle θ from the steering angle sensor 200, and calculate the steering angular velocity ω by differentiating the steering angle θ with respect to time. In the present embodiment, however, the steering angle sensor 200 may detect the steering angle θ and the steering angular velocity ω, and transfer the detected steering angle and steering angular velocity to the controller 400. The steering angle θ and the steering angular velocity ω may be used when the controller 400 calculates the basic assist torque and the compensation ratio depending on sudden steering as described later.

The vehicle velocity sensor 300 may detect a vehicle velocity V of the vehicle in operation, and transfer the detected vehicle velocity V to the controller 400. The vehicle velocity sensor 300 may include various sensors, for example, a sensor for detecting the vehicle velocity V using the angular velocity of a wheel, a sensor for detecting the vehicle velocity V by measuring an RPM (Revolutions Per Minute), and a sensor for detecting the vehicle velocity V using a GPS (Global Positioning System). The detected vehicle velocity V may be used when the controller 400 calculates the basic assist torque and the compensation ratio depending on sudden steering as described later.

The controller 400 may calculate the compensation ratio by sudden steering, based on one or more of the column torque Tcol detected by the column torque sensor 100 and the steering angular velocity ω calculated from the steering angle θ detected by the steering angle sensor 200, and compensate for the basic assist torque outputted from the MDPS system 410 depending on the compensation ratio.

The operation of the controller 400 to compensate for the basic assist torque will be described in detail with reference to FIG. 2. As illustrated in FIG. 2, the controller 400 may include an MDPS system 410, a compensation ratio calculator 430 and a selector 450. FIG. 2 illustrates that the MDPS system 410 is included in the controller 400. In another embodiment, however, the MDPS system 410 may be independently implemented in parallel to the controller 400. In this case, the controller 400 may receive the basic assist torque from the MDPS system 410, and compensate for the basic assist torque in consideration of sudden steering.

The MDPS system 410 may calculate the basic assist torque based on main assist torque calculated through a boost calculation unit 411 and self-alignment torque calculated through a damping calculation unit 413 and a return calculation unit 415. Since the process of calculating the basic assist torque through the MDPS system 410 is publicly known to those skilled in the art, the detailed descriptions thereof are omitted herein.

As described above, the basic assist torque which is calculated on the basis of the main assist toque and the self-alignment torque relies on the preset tuning parameters without considering the compensation for sudden steering. Thus, in the present embodiment, the controller 400 may calculate a predetermined compensation ratio through the compensation ratio calculator 430 and the selector 450, and compensate for the basic assist torque depending on the calculated compensation ratio.

The compensation ratio calculator 430 may calculate the compensation ratio by sudden steering, based on one or more of the column torque Tcol and the steering angular velocity ω. That is, since a driver's sudden steering rapidly increases the column torque Tcol or the steering angular velocity ω, the compensation ratio calculator 430 determine the driver's sudden steering and calculate the compensation ratio, based on one or more of the column torque Tcol and the steering angular velocity ω. The compensation ratio calculator 430 may calculate the compensation ratio using only one of the column torque Tcol and the steering angular velocity ω. Preferably, however, the compensation ratio calculator 430 may calculate the compensation ratio using both of the column torque Tcol and the steering angular velocity ω, in order to improve the precision of the sudden steering determination and the compensation ratio calculation.

The compensation ratio calculator 430 may calculate the compensation ratio by further considering the vehicle velocity V detected by the vehicle velocity sensor 300. That is, when the vehicle is driving at high velocity, larger compensation torque needs to be calculated to assist a driver's sudden steering, in order to effectively avoid a collision with an external obstacle. On the other hand, when the vehicle is driving at low velocity, compensation torque required for avoiding a collision may be lower than when the vehicle is driving at high velocity. Therefore, the compensation ratio calculator 430 can calculate the compensation ratio by further considering the vehicle velocity V, thereby further improving the driver's steering feel against sudden steering while a collision with an obstacle is effectively avoided.

The method for calculating the compensation ratio will be described in detail.

The compensation ratio calculator 430 may calculate the compensation ratio based on a column torque compensation gain, a steering angular velocity compensation gain and a vehicle velocity compensation gain, which are calculated from the column torque Tcol, the steering angular velocity ω and the vehicle velocity V, respectively.

More specifically, the compensation ratio calculator 430 may calculate the compensation ratio, based on the column torque compensation gain which is calculated as a larger value as the column torque increases in a preset torque compensation section [A, B] illustrated in FIG. 2, the steering angular velocity compensation gain which is calculated as a larger value as the steering angular velocity increases in a preset angular velocity compensation section [C, D], and the vehicle velocity compensation gain which is calculated as a larger value as the vehicle velocity increases in a preset vehicle velocity compensation section [E, F].

The torque compensation section and the angular velocity compensation section may indicate a column torque section and a steering angular velocity section, respectively, in which the basic assist torque needs to be compensated for due to the driver's sudden steering, and which are preset in order to set reference values for determining whether the driver suddenly operates the steering wheel. The vehicle velocity compensation section may indicate a preset reference vehicle velocity section for avoiding a collision with an external obstacle. The torque compensation section, the angular velocity compensation section and the vehicle velocity compensation section may be designed in various manners based on the specification of the MDPS system and an experiment result of a designer, and set in the controller 400 in advance.

When the column torque Tcol is detected as a value equal to or less than the minimum column torque (value A in FIG. 2) of the torque compensation section, the compensation ratio calculator 430 may determine that the driver's sudden steering is not detected, and set the column torque compensation gain to 0. Furthermore, when the column torque Tcol is detected as a value equal to or more than the maximum column torque (value B in FIG. 2) of the torque compensation section, the compensation ratio calculator 430 may set the column torque compensation gain to 1, in order to prevent excessive torque compensation. In the torque compensation section, the column torque compensation gain may be calculated as a larger value, as the column torque Tcol increases. At this time, the compensation ratio calculator 430 may use various methods such as a method for setting the column torque compensation gain in proportion to the column torque and a method for setting the column torque compensation gain to increase in a stepwise manner according to the column torque. The compensation ratio calculator 430 may calculate the column torque compensation gain by referring to a preset map or lookup table between the column torque and the column torque compensation gain, or using various methods such as a function of the column torque compensation gain with respect to the column torque.

The steering angular velocity compensation gain and the vehicle velocity compensation gain may be calculated in the same manner as the above-described method for calculating the column torque compensation gain.

As a result, the compensation ratio may be calculated as 0 when any one of the three compensation gains is calculated as a value of 0, calculated as 1 when all of the compensation gains are calculated as a value of 1, and calculated as a value between 0 and 1 in the other cases.

FIG. 2 illustrates the method for calculating the compensation ratio as the product of the column torque compensation gain, the steering angular velocity compensation gain and the vehicle velocity compensation gain. However, the calculation method is not limited to the method illustrated in FIG. 2, and various methods such as a method using a 3D map of the compensation ratio for the three kinds of compensation gains may be employed.

When the compensation ratio is calculated, the controller 400 may compensate for the basic assist torque depending on the compensation ratio.

Specifically, the controller 400 may calculate sudden steering assist torque by multiplying the basic assist torque by the compensation ratio, and compensate for the basic assist torque by adding the calculated sudden steering compensation torque to the basic assist torque. Therefore, the final assist torque may be calculated as expressed by Equation 1 below:

Final assist torque=sudden steering compensation torque+basic assist torque=basic assist torque× compensation ratio+basic assist torque=basic
assist torque×(1+compensation ratio)  [Equation 1]

Depending on the compensation ratio, the final assist torque calculated through Equation 1 may be calculated as follows. When the compensation ratio is 0, the final assist torque may be equal to the basic assist torque. Therefore, when the compensation ratio is 0, the controller 400 provides no compensation for the basic assist torque.

When the compensation ratio has a value between 0 and 1, for example, a value of 0.5, the final assist torque may be calculated as (1.5*basic assist torque), and the controller 400 may increase the basic assist torque to reduce a heavy steering feel of the driver by sudden steering.

When the compensation ratio is 1, the final assist torque may be doubled from the basic assist torque. In this case, since the basic assist torque is excessively compensated for, an excessive steering risk may be caused by sudden steering. Thus, in the present embodiment, the controller 400 may compensate for the basic assist torque using the preset maximum assist torque.

That is, the controller 400 may compensate for the basic assist torque through a method which sets the maximum assist torque in advance and sets the final assist torque to the maximum assist torque when the compensation ratio is 1 or a method which adds the preset maximum assist torque to the basic assist torque. At this time, the preset maximum assist torque may be set in such a range that is equal to or more than the basic assist torque, but does not exceed the double of the basic assist torque.

FIG. 2 illustrates that the selector 450 receives the basic assist torque, the maximum assist torque, and the torque obtained by adding the sudden steering compensation torque to the basic assist torque, and selects and outputs torque according to the compensation ratio. However, various methods may be employed as long as the basic assist torque can be compensated for according to the compensation ratio, and the present invention is not limited to the method illustrated in FIG. 2.

Although not illustrated in FIG. 2, the output of the final assist torque may be limited depending on the specification of the MDPS system, and the final assist torque between the lower limit value and the upper limit value of the output limitation may be outputted.

So far, the MDPS system 410, the compensation ratio calculator 430 and the selector 450 have been described as separate components in the controller 400. In another embodiment, however, the controller 400 may be configured as a combined unit which performs the overall operations of the respective units 410, 430 and 450.

Figure 3:
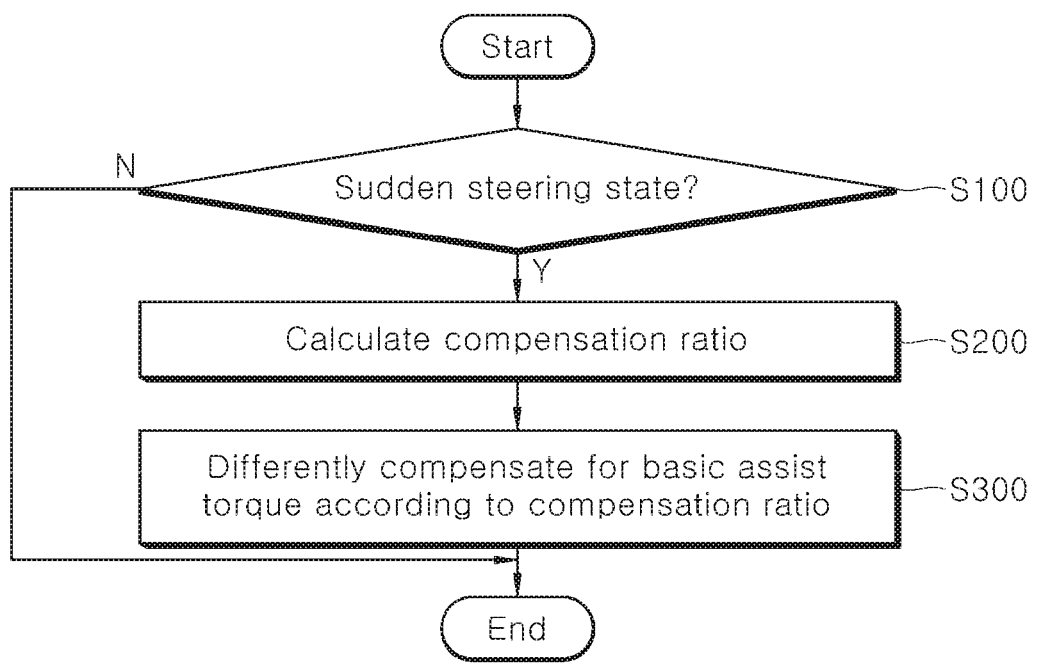
FIG. 3 is a flowchart illustrating a torque compensation method for an MDPS system in accordance with an embodiment of the present invention.

FIG. 3 is a flowchart illustrating a torque compensation method for an MDPS system in accordance with an embodiment of the present invention.

Referring to FIG. 3, the torque compensation method for an MDPS system in accordance with the embodiment of the present invention will be described as follows. First, the controller 400 may determine whether the steering state of the vehicle is a sudden steering state, based on one or more of the column torque Tcol and the steering angular velocity ω. When the column torque Tcol is detected as a value equal to or more than the minimum column torque of the torque compensation section, or when the steering angular velocity ω is detected as a value equal to or more than the minimum steering angular velocity of the angular velocity compensation section, the controller 400 may determine that the steering state of the vehicle is a sudden steering state.

When the steering state of the vehicle is a sudden steering state, the controller 400 may calculate the compensation ratio by the sudden steering, based on one or more of the column torque Tcol and the steering angular velocity ω, at step S200. When the compensation ratio is calculated, the vehicle velocity V may be further considered as described above, and the specific process of calculating the compensation ratio has been described above. Therefore, the detailed descriptions thereof are omitted herein.

Then, the controller 400 may differently compensate for the basic assist torque outputted from the MDPS system 410 according to the compensation ratio, at step S300.

Specifically, when the compensation ratio has a value between 0 and 1, the controller 400 may differently compensate for the basic assist torque by adding the sudden steering compensation torque to the basic assist torque, the sudden steering compensation torque being calculated as the product of the basic assist torque and the compensation ratio.

Furthermore, when the compensation ratio has a value of 1, the controller 400 may compensate for the basic assist torque using the preset maximum assist torque.

On the other hand, when the compensation ratio has a value of 0, the controller 400 may determine that the steering state of the vehicle does not correspond to the sudden steering condition, steps following step S200 may not be performed, and the procedure may be ended. Therefore, the basic assist torque may not be compensated for.

As such, the torque compensation apparatus and method can enable a driver to easily handle the steering wheel in case of sudden steering, thereby effectively avoiding a collision with an external obstacle while improving the driver's steering feel. Furthermore, the torque compensation apparatus and method can calculate the sudden steering compensation torque using the parameter such as the column torque which the existing MDPS system has used to calculate the assist torque without an additional device, which makes it possible to simplify the system.

Although exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A torque compensation apparatus for a Motor Driven Power Steering ("MDPS") system, comprising:
    a column torque sensor configured to detect a column torque applied to a steering shaft;
    a steering angle sensor configured to detect a steering angle of a steering wheel; and
    a controller configured to calculate a compensation ratio by sudden steering, based on at least one of the column torque detected by the column torque sensor and a steering angular velocity calculated from the steering angle detected by the steering angle sensor, and compensate for basic assist torque outputted from the MDPS system according to the compensation ratio,
    wherein when the compensation ratio has a value between 0 and 1, the controller compensates for the basic assist torque by adding sudden steering compensation torque to the basic assist torque, the sudden steering compensation torque being calculated as the product of the basic assist torque and the compensation ratio.

2. The torque compensation apparatus of claim 1, further comprising a vehicle velocity sensor configured to detect a vehicle velocity, wherein the controller calculates the compensation ratio by further considering the vehicle velocity detected by the vehicle velocity sensor.

3. The torque compensation apparatus of claim 2, wherein the controller calculates the compensation ratio, based on a column torque compensation gain which is calculated as a larger value as the column torque increases in a preset torque compensation section, a steering angular velocity compensation gain which is calculated as a larger value as the steering angular velocity increases in a preset angular velocity compensation section, and a vehicle velocity compensation gain which is calculated as a larger value as the vehicle velocity increases in a preset vehicle velocity compensation section.

4. The torque compensation apparatus of claim 1, wherein:
when the compensation ratio has a value of 0, the controller provides no compensation for the basic assist torque; and
when the compensation ratio has a value of 1, the controller compensates for the basic assist torque using preset maximum assist torque.

5. A torque compensation method for a Motor Driven Power Steering ("MDPS") system, comprising:
determining, by a controller, whether a steering state of a vehicle is a sudden steering state, based on at least one of a column torque and a steering angular velocity;
calculating, by the controller, a compensation ratio by sudden steering based on at least one of the column torque and the steering angular velocity, when the steering state of the vehicle is a sudden steering state; and
compensating for, by the controller, basic assist torque outputted from the MDPS system according to the compensation ratio,
wherein, in the compensating for the basic assist torque, when the compensation ratio has a value between 0 and 1, the controller compensates for the basic assist torque by adding sudden steering compensation torque to the basic assist torque, the sudden steering compensation torque being calculated as the product of the basic assist torque and the compensation ratio.

6. The torque compensation method of claim 5, wherein in the calculating of the compensation ratio,
the controller calculates the compensation ratio by further considering a vehicle velocity.

7. The torque compensation method of claim 6, wherein in the calculating of the compensation ratio,
the controller calculates the compensation ratio, based on a column torque compensation gain which is calculated as a larger value as the column torque increases in a preset torque compensation section, a steering angular velocity compensation gain which is calculated as a larger value as the steering angular velocity increases in a preset angular velocity compensation section, and a vehicle velocity compensation gain which is calculated as a larger value as the vehicle velocity increases in a preset vehicle velocity compensation section.

8. The torque compensation method of claim 5, wherein in the compensating for the basic assist torque,
when the compensation ratio has a value of 1, the controller compensates for the basic assist torque using preset maximum assist torque.

* * * * *